(12) United States Patent
Maekawa et al.

(10) Patent No.: US 7,641,877 B2
(45) Date of Patent: Jan. 5, 2010

(54) PROCESS FOR DISPOSING WASTE GAS COMPRISING SULFUR OXIDES AND APPARATUS THEREOF

(75) Inventors: Sachio Maekawa, Toshima-ku (JP); Shinichi Kawabata, Toshima-ku (JP); Keigo Orita, Toshima-ku (JP)

(73) Assignee: Hitachi Plant Technologies, LTD., Tokyo (JP)

( * ) Notice: Subject to any disclaimer, the term of this patent is extended or adjusted under 35 U.S.C. 154(b) by 140 days.

(21) Appl. No.: 11/905,465

(22) Filed: Oct. 1, 2007

(65) Prior Publication Data

US 2008/0311016 A1 Dec. 18, 2008

(30) Foreign Application Priority Data

Jan. 15, 2007 (JP) .............................. 2007-005505

(51) Int. Cl.
*B01D 53/50* (2006.01)
*B01D 53/74* (2006.01)
*B01D 53/78* (2006.01)
*B01D 49/00* (2006.01)
*G05D 7/00* (2006.01)
*G05D 23/00* (2006.01)

(52) U.S. Cl. .............................. 423/243.01; 423/215.5; 423/DIG. 6; 422/105; 422/108; 422/109; 422/168; 422/169

(58) Field of Classification Search ............ 423/243.01, 423/215.5, DIG. 6; 422/105, 108, 109, 168, 422/169

See application file for complete search history.

(56) References Cited

U.S. PATENT DOCUMENTS 4,783,326 A * 11/1988 Srednicki ............... 423/243.03
5,791,268 A * 8/1998 Battles et al. ............... 110/345

FOREIGN PATENT DOCUMENTS

| JP | A-59-16526 | 1/1984 |
| JP | A 10-230128 | 9/1998 |
| JP | A 2002-45643 | 2/2002 |

OTHER PUBLICATIONS

The English translation of JP 59-16,526 A dated Jan. 27, 1984.*

* cited by examiner

*Primary Examiner*—Timothy C Vanoy
(74) *Attorney, Agent, or Firm*—Oliff & Berridge, PLC

(57) ABSTRACT

A method for enlarging the particle diameters of sulfuric acid mists in waste gas and collecting the sulfuric acid mists in high efficiency is provided. A process for disposing waste gas containing sulfur oxides that introduces the waste gas in dry type electrostatic precipitator to remove dusts and then introduces the waste gas in a wet desulfurization apparatus to carry out desulfurization, wherein the waste gas temperature of a smoke channel at a more upstream side than the wet desulfurization apparatus is measured, the flow channel length is variable based on the measurement value of the waste gas temperature, the waste gas is flown to a flow channel means that is adjusted at a channel length capable of cooling the waste gas to the dew point of acid by heat release and then, the waste gas is introduced into the wet desulfurization apparatus.

4 Claims, 4 Drawing Sheets

PROCESS FOR DISPOSING WASTE GAS COMPRISING SULFUR OXIDES AND APPARATUS THEREOF

BACKGROUND (a) Field of the Invention

The present invention relates to a process for disposing waste gas containing sulfur oxides discharged from a coal thermal power station and specifically relates to a process for disposing waste gas that collects sulfuric acid mist contained in the waste gas.

(b) Description of the Related Art

Harmful substances such as sulfur compounds prepared from sulfur contained in fuel and nitrogen oxides obtained by oxidizing nitrogen in a combustion chamber at high temperature and high pressure state are contained in waste gas discharged from a boiler of a coal thermal power station, in addition to carbon dioxide being a main component. Consequently, the waste gas is discharged in atmosphere through the collection treatment of denitrogenation and desulfurization in series so that the waste gas discharged does not affect peripheral environment. In a general waste gas disposal apparatus, a denitration apparatus, dry type electrostatic precipitator, a wet desulfurization apparatus and wet type electrostatic precipitator are arranged in order from the boiler and connected in series through piping.

The denitration apparatus is an apparatus decomposing nitrogen oxides (NOx) in the waste gas to harmless nitrogen ($N_2$) and water vapor ($H_2O$) by the action of a catalyst using ammonia ($NH_3$).

The dry type electrostatic precipitator is an apparatus providing electric charge to dusts floating in air by corona discharge emitted from a discharge electrode and collecting the particles to a dust-collecting electrode by Coulomb force.

The wet desulfurization apparatus is an apparatus for carrying out the desulfurization treatment of the waste gas by spraying slurry comprising slurry materials such as lime hydrate and magnesium hydroxide for the waste gas to carry out gas-liquid contact, absorbing sulfur dioxide and the like in the slurry through chemical change with the slurry materials and discharging them out of the system.

The wet type electrostatic precipitator is an apparatus that adds a function of jetting water on the dust-collecting electrode of the dry type electrostatic precipitator with a spray and the like and can always discharge mists and dusts out of the system.

The sulfur compounds contained in the waste gas are mainly sulfur dioxide ($SO_2$), but one portion is changed to sulfur trioxide ($SO_3$) by combustion in a boiler and the catalytic oxidation of the denitration apparatus and further, sulfur trioxide is converted to sulfuric acid if it is reacted with water in the wet desulfurization apparatus. When the concentration of sulfur trioxide is several tens ppm, it is gaseous if temperature is one hundred several tens degree or more but when the gas temperature is the dew point of acid or less (for example, when the concentration of $SO_3$ is 1 to 100 ppm, the dew point of sulfuric acid is 120° C. to 150° C.), it is condensed to be sulfuric acid mists. Since the sulfuric acid mists are corrosive, the temperature of the waste gas is controlled at higher temperature than the dew point of acid, for example, at about 170° C. or more by an air heater and the generation of the sulfuric acid mist is suppressed at a frontal stage of the wet desulfurization apparatus.

By the way, since the wet desulfurization apparatus has the highest desulfurization performance nearby the dew point of water, a large quantity of circulation water is sprayed in the apparatus. Accordingly, in the wet desulfurization apparatus, the temperature of the waste gas is abruptly lowered from about 170° C. to about 50° C. to 60° C. being the dew point of water. At this time, sulfuric acid in the waste gas is converted to mists at the lowering of temperature in the wet desulfurization apparatus. Since the particle diameters of the sulfuric acid mists by such abrupt cooling are small, collision probability with the sprayed slurry is low and it is difficult to remove it in the wet desulfurization apparatus. In this case, the sulfuric acid mists flow to the wet type electrostatic precipitator at a posterior stage. Further, when the waste gas is abruptly cooled, mists with a small particle diameter are generated, but since the finer the particles are, the higher the vapor pressure of particle surface is, coagulation effect using this as coagulation nuclei is not obtained and the diameters of mists cannot be enlarged.

On the other hand, the particle diameters of mists being collection objectives affect greatly collection performance in the wet type electrostatic precipitator and when the particle diameters are small, migration speed is little; therefore collection efficiency is greatly lowered. In this case, it is necessary to increase electric charge time for the sulfuric acid mists with small particle diameters in order to collect the sulfuric acid mists that passed the wet desulfurization apparatus, and consequently, the apparatus capacity of the wet type electrostatic precipitator must be enlarged; therefore the apparatus is jumboized. In particular, when the particle diameters of the sulfuric acid mists are submicron order with 1 µm or less, it is difficult to charge and there is fear that the sulfuric acid mists pass the wet type electrostatic precipitator and are discharged out of the system. Consequently, it is necessary to enlarge the particle diameters of the sulfuric acid mists to micron order in order not to discharge the sulfuric acid mists out of the system without loading the wet type electrostatic precipitator.

As means for solving the problem, Japanese Unexamined Patent Publication No.2002-45643 discloses a method of spraying liquid such as water to waste gas introduced into the wet desulfurization apparatus, cooling the temperature of the waste gas to 120° C. to 150° C. and keeping the cooling temperature for 0.5 sec or more. According to the method, the average particle diameter of the sulfuric acid mists in the waste gas introduced into the wet desulfurization apparatus can be enlarged to micron order. Consequently, the average particle diameter of the sulfuric acid mists in the waste gas passing the wet desulfurization apparatus is also micron order and the collection performance of the sulfuric acid mists in the wet type electrostatic precipitator at a posterior stage can be enhanced.

However, the spraying of spray water for cooling the waste gas of Japanese Unexamined Patent Publication No.2002-45643 is not easy in the adjustment of the particle diameters of sprayed water and water quantity for enlarging the particle diameters of the sulfuric acid mists. Further, the patent document 1 has a problem that a cooling means of spraying liquid for lowering the temperature of the waste gas must be provided between the dry type electrostatic precipitator and the wet desulfurization apparatus and facility cost is high.

Further, the stack gas desulfurization method of Japanese Unexamined Patent Publication No.10-230128 is a method of condensing water vapor using fine dusts as nuclei, generating mists and improving the collection efficiency of the fine dusts, but the adjustment of the particle diameters of spraying water and water quantity is difficult in like manner as Japanese Unexamined Patent Publication No.2002-45643 and the particle diameters of the sulfuric acid mists are not considered at all.

DETAILED DESCRIPTION OF THE INVENTION

SUMMARY OF THE INVENTION

Then, the purpose of the present invention has been carried out considering these circumstances and is to provide a method for enlarging the particle diameters of sulfuric acid mists in waste gas and collecting the sulfuric acid mists in high efficiency and an apparatus.

The disposal process of waste gas including sulfur oxides related to the present invention is a process for disposing waste gas containing sulfur oxides that introduces the waste gas in dry type electrostatic precipitator to remove dusts and then introduces the waste gas in a wet desulfurization apparatus to carry out desulfurization, wherein the waste gas temperature of a smoke channel at a more upstream side than the wet desulfurization apparatus is measured, the waste gas is flown to a flow channel means that is adjusted at a channel length capable of cooling the waste gas to the dew point of acid by heat release based on the measurement value of the waste gas temperature and then, the waste gas is introduced into the wet desulfurization apparatus.

Further, the adjustment of the channel length being the flow channel means is characterized in being carried out by controlling the length at which the waste gas temperature at downstream side is the dew point of acid of the waste gas.

The process of disposing waste gas containing sulfur oxides related to the present invention is a process for disposing waste gas comprising sulfur oxides that introduces the waste gas in dry type electrostatic precipitator to remove dusts and then introduces the waste gas in a wet desulfurization apparatus to carry out desulfurization, wherein the waste gas temperature of a smoke channel at a more upstream side than the wet desulfurization apparatus is measured, the waste gas is flown to a heat exchange means that is adjusted at the length of a heat exchange zone capable of cooling the waste gas to the dew point of acid by heat exchange based on the measurement value of the waste gas temperature and then, the waste gas is introduced into the wet desulfurization apparatus.

Further, the adjustment of the length of the heat exchange zone is carried out by controlling the operational number of heat exchangers in which temperature at the downstream side of the heat exchangers is the dew point of acid of the waste gas using the heat exchangers arranged in series in the smoke channel.

On the other hand, the disposal apparatus of waste gas containing sulfur oxides related to the present invention is an apparatus for disposing waste gas containing sulfur oxides that introduces the waste gas in dry type electrostatic precipitator to remove dusts and then introduces the waste gas in a wet desulfurization apparatus to carry out desulfurization, characterized in having a flow channel means capable of cooling the waste gas by heat release and capable of changing the flow channel length of the waste gas, a sensor measuring the waste gas temperature in a smoke channel at a more upstream side than the wet desulfrization apparatus, and a control portion being connected with the flow channel means and the sensor and controlling the flow channel length of the flow channel means so as to be able to cool the waste gas to the dew point of acid based on the measurement value of the sensor, in the fore-mentioned smoke channel.

Further, the disposal apparatus of waste gas including sulfur oxides related to the present invention is an apparatus for disposing waste gas containing sulfur oxides that introduces the waste gas in dry type electrostatic precipitator to remove dusts and then introduces the waste gas in a wet desulfurization apparatus to carry out desulfurization, characterized in having heat exchange means arranged in series in the smoke channel that can cool the waste gas by heat exchange, a sensor measuring the waste gas temperature in the smoke channel at a more upstream side than the wet desulfrization apparatus, and a control portion being connected with the flow channel and the sensor and determining the operational number of heat exchangers so as to be able to cool the waste gas to the dew point of acid based on the measurement value of the sensor, in the fore-mentioned smoke channel.

The present invention cools the waste gas introduced in the wet desulfurization apparatus to the dew point of acid in the waste gas disposal apparatus of the coal thermal power station. Specifically, the waste gas is detoured to release heat by providing a bypass tube being heat-releasing means at the smoke channel of the frontal stage of the wet desulfurization apparatus and the waste gas temperature is cooled to the dew point of acid. Thereby, the mist diameter of the sulfuric acid mists can be enlarged by coagulation effect of cooling the waste gas to the dew point of acid by heat release without depending on water spray that is difficult for adjusting the cooling temperature of the waste gas. Consequently, the collection efficiency of the mists in the desulfurization apparatus is improved and the wet type electrostatic precipitator at a posterior stage can be miniaturized. Accordingly, the initial cost and running cost of the wet type electrostatic precipitator are reduced.

Further, the waste gas temperature of the smoke channel from a boiler to a suction blower can be controlled by sealing system. Accordingly, the suction blower can be operated within a range of operational capacity without raising the suction load of the suction blower.

Further, the waste gas is cooled to the dew point of acid by heat exchange and the mist diameter of the sulfuric acid mists can be enlarged by condensation effect.

DETAILED DESCRIPTION OF THE PREFERRED EMBODIMENTS

Figure 1:
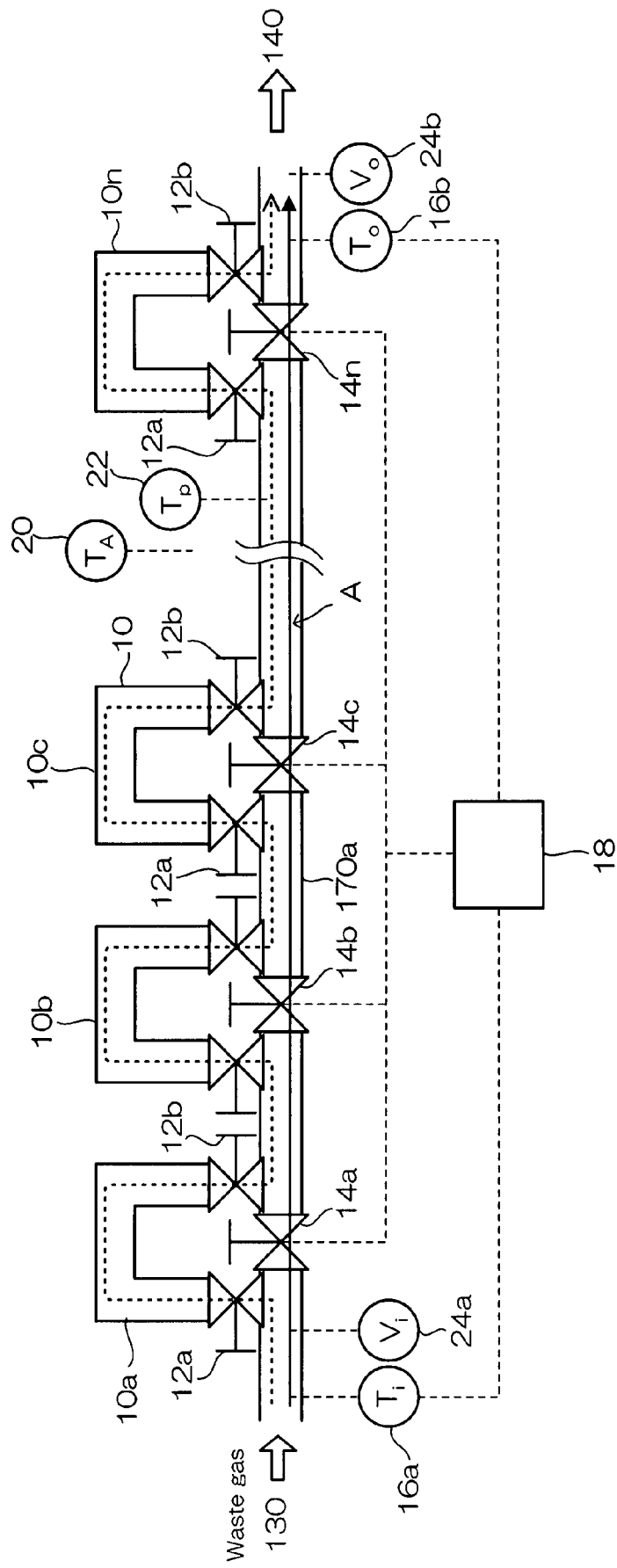
FIG. 1 is the magnified view of the major portion of the process for disposing waste gas containing sulfur oxides related to the present invention.
Figure 2:
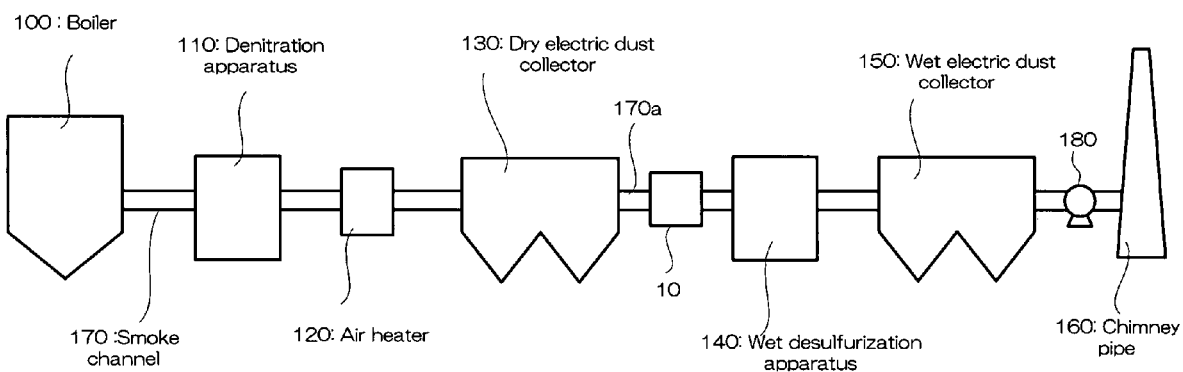
FIG. 2 is the whole flow diagram of the process for disposing waste gas containing sulfur oxides.
Figure 3:
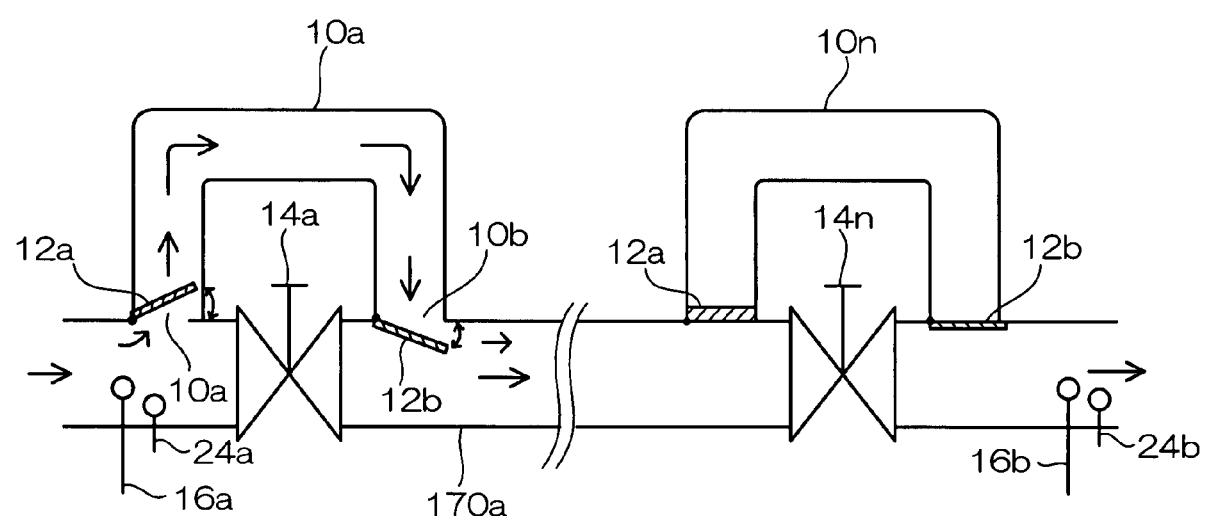
FIG. 3 is an explanation diagram of the bypass tube of the present invention.

The Embodiments of the process for disposing waste gas containing sulfur oxides and its apparatus of the present invention are explained below in details referring to the attached drawings. FIG. 1 is the explanation drawing of the major portion of the apparatus for disposing waste gas containing sulfur oxides related to Embodiment. FIG. 2 is the whole flow diagram of the process for disposing waste gas containing sulfur oxides. FIG. 3 is an explanation diagram of the bypass tube of the present invention.

Firstly, as shown in FIG. 2, the disposal apparatus of waste gas is connected with a boiler 100, a denitration apparatus 110, an air heater 120, dry type electrostatic precipitator 130, a wet desulfurization apparatus 140, wet type electrostatic precipitator 150, a suction blower 180 and a chimney pipe 160 in order in series by a smoke channel 170. After the suction blower 180 sucked the waste gas of the smoke channel 170 from the boiler 100 to the wet type electrostatic precipitator 150, it discharges the waste gas from the chimney pipe 160 to atmospheric air. Further, flow channel means (a bypass tube 10) that cools the waste gas by heat release is provided in intervention at the smoke channel 170 connecting the dry type electrostatic precipitator 130 with the wet desulfurization apparatus 140. Hereat, the upstream side of the smoke channel 170 shows a side at which the boiler 100 is connected and the downstream side of the smoke channel 170 shows a side at which the chimney pipe 160 is connected, respectively.

Firstly, as shown in FIG. 2, the whole disposal flow of the waste gas containing sulfur oxides is explained. The waste gas discharged from the boiler 100 of a heat power station contains nitrogen oxides, sulfur oxides, dusts and the like. Then, the waste gas is introduced from the boiler 100 to the denitration apparatus 110. After ammonia is sprayed to the waste gas containing nitrogen oxides in the denitration apparatus 110, it is passed through a catalyst layer. The nitrogen oxides are decomposed to nitrogen and water by action with the catalyst. The temperature of the waste gas passing the denitration apparatus 110 is controlled by the air heater 120 at temperature higher than the dew point of acid at which sulfuric acid mists are not generated. Then, the waste gas passing the air heater 120 is introduced to the dry type electrostatic precipitator 130 to remove dusts in the waste gas. Then, the waste gas from which dusts were removed carries out the control of temperature in the smoke channel 170a to which the heat release means related to the present invention that is described later is arranged. The waste gas whose temperature was controlled is introduced in the wet desulfurization apparatus 140 and absorbs mainly sulfur dioxide in the waste gas to remove it by spraying slurry such as lime hydrate and magnesium hydroxide. Then, the waste gas desulfurized is introduced in the wet type electrostatic precipitator 150, mists are removed and then, the waste gas is discharged from the chimney pipe 160 to atmospheric air.

Then, the heat release means related to the present invention is explained. A plurality of the bypass tubes 10 carrying out the cooling of the waste gas by heat release are provided so as to detour along the flow channel of the waste gas of the smoke channel 170a linking between the outlet of the dry type electrostatic precipitator 130 and the inlet of the wet desulfurization apparatus 140, as shown in FIG. 1. The flow channel of the waste gas can be elongated by introducing the waste gas in the bypass tube 10. As shown in FIG. 3, the bypass tube 10 is a piping with a less diameter than the smoke channel 170, opening at one end is set as an introducing inlet 10a of the waste gas flowing the smoke channel 170a, and opening at another end is set as a discharge orifice 10b discharging again the waste gas from the waste gas introducing inlet 10a to the smoke channel 170a. The bypass tube 10 installs respectively the introducing inlet 10a of the waste gas at the upstream side of the smoke channel 170 and the discharge orifice 10b of the waste gas at the downstream side of the smoke channel 170, and a plurality are provided at the smoke channel 170a along the flow channel (FIG. 1, the arrow make A) of the waste gas. Further, a reverse-flow protective valve 12a is installed at the introducing inlet 10a of the waste gas of the bypass tube 10. The reverse-flow protective valve 12a is installed so that the waste gas flows from the smoke channel 170a to the bypass tube 10. Further, the reverse-flow protective valve 12a prevents the reverse flow by which the waste gas flows from the bypass tube 10 to the smoke channel 170a. Further, a reverse-flow protective valve 12b is installed at the discharge orifice lob of the waste gas. The reverse-flow protective valve 12b is installed so that the waste gas flows from the bypass tube 10 to the smoke channel 170a. Further, the reverse-flow protective valve 12b prevents reverse flow that the waste gas flows from the smoke channel to the bypass tube.

Opening and closing valve 14 is provided at the smoke channel 170a. The opening and closing valve 14 is provided at the smoke channel 170a between the introducing inlet 10a of the waste gas of the bypass tube 10 and the discharge orifice 10b of the waste gas and is designed so as to arbitrarily adjust the flow rate of the waste gas flowing in the smoke channel. The opening and closing valves 14 are installed in accordance with the installation number (a to n) of the bypass tubes 10. The bypass tubes 10 are arranged so as to detour over the opening and closing valves 14. Further, the reverse-flow protective valve 12 is energized to close the introducing inlet 10a and the discharge orifice 10b of the bypass tube 10 and when a fixed pressure is applied by the waste gas in accordance with the flow rate adjustment of the opening and closing valve 14, the introducing inlet 10a and discharge orifice 10b of the bypass tube 10 are designed to be opened.

Further, the temperature sensor 16 of the waste gas is installed at the smoke channel 170a. The temperature sensor 16 related to Embodiment installs the first temperature sensor 16a nearby the introducing inlet 10a of the waste gas of the bypass tube 10a installed at the most upstream side of the smoke channel 170a and installs the second temperature sensor 16b at a position that is nearby the discharge orifice 10b of the waste gas of the bypass tube 10n installed at the most downstream side and at the upstream side of the wet desulfurization apparatus. The sensor portion of the temperature sensor 16 is installed in the smoke channel and measures the temperature of the waste gas flowing in the smoke channel at the upstream side and downstream side.

The control portion 18 is connected with the opening and closing valve 14 and the temperature sensor 16. The control portion 18 is installed so as to be able to adjust the opening and closing quantity of the opening and closing valve 14 based on the measurement values of the first and second temperature sensors 16a and 16b.

Further, the disposal apparatus of waste gas related to Embodiment is provided with the temperature sensor 20 of atmospheric air, the temperature sensors 22 of smoke channel wall surface and the flow rate sensors 24 of waste gas. The temperature sensor 20 of atmospheric air is a temperature sensor measuring the temperature ($T_A$) of atmospheric air around the smoke channel 170a. The temperature sensors 22 of smoke channel wall surface are temperature sensors measuring the wall surface temperature ($T_p$) of the smoke channel 170a. Further, the flow rate sensors 24 of waste gas are provided at 2 spots of the upstream side and downstream side of the smoke channel 170a in like manner as the first and second temperature sensors 16a and 16b. Namely, the first flow rate sensor 24a is provided around the introducing inlet 10a of the waste gas of the bypass tube 10a installed at the most upstream side of the smoke channel 170a. Further, the second flow rate sensor 24b is installed at a position that is nearby the discharge orifice 10b of the waste gas of the bypass tube 10n installed at the most downstream side and at the most upstream side of the wet desulfurization apparatus. The temperature sensor 20 of atmospheric air, the temperature sensors 22 of smoke channel wall surface and the flow rate sensors 24 of waste gas are connected with the control portion 18 and are composed so that respective measurement values can be transmitted. Further, in FIG. 1, the control portion 18 shows a composition for convenience sake that it is connected with the opening and closing valves 14 and the temperature sensors 16 and the connection composition of the temperature sensor 20 of atmospheric air, the temperature sensors 22 of smoke channel wall surface and the flow rate sensors 24 of waste gas is shown in abbreviation.

Then, the process for disposing waste gas containing sulfur oxides by the above-mentioned composition is explained. The waste gas containing sulfur oxides is introduced from the boiler 100 to the denitration apparatus 110 and nitrogen oxides are removed. It is controlled by the air heater 120 at higher temperature at which $SO_3$ in the waste gas is not condensed and sulfuric acid mists are not generated, than the dew point of acid (120° C. to 150° C.), for example, 170° C. and is introduced into the dry type electrostatic precipitator 130. Dusts contained in the waste gas are removed in the dry type electrostatic precipitator 130. The waste gas passing dust removal treatment by the dry type electrostatic precipitator 130 is introduced into the smoke channel 170a between the dry type electrostatic precipitator 130 and the wet desulfurization apparatus 140. Then, the waste gas temperature $T_i$ at the upstream side of the smoke channel and the waste gas temperature $T_O$ at the downstream side are measured by the first temperature sensor 16a and the second temperature sensor 16b provided at the smoke channel 170a. Further, the waste gas flow rate $V_i$ at the upstream side of the smoke channel and the waste gas flow rate $V_O$ at the downstream side are measured by the first flow rate sensor 24a and the second flow rate sensor 24b. The measurement values ($T_i$, $T_O$, $V_i$ and $V_O$) of the first and second temperature sensors 16a and 16b and the first and second flow rate sensors 24a and 24b are inputted in the control portion 18 and temperature control is carried out so that the measurement value $T_O$ of the waste gas temperature at the downstream side of the smoke channel 170a is the dew point of acid (120° C. to 150° C.). Namely, the control portion 18 determines the number of the bypass tubes 10 to be let the waste gas detour (bypass) based on the measurement values of the waste gas temperatures and the waste gas flow rates at the upstream side and downstream side of the smoke channel 170a, the temperature of atmospheric air and the wall surface temperature of the smoke channel.

The specific determination of the number of the bypass tubes is carried out as below. In the present invention, a case that the sectional shape of a piping is circular shape is explained below as an example. When the waste gas temperature in the inside of the smoke channel 170a is changed from the waste gas temperature $T_i$ at the upstream side to the waste gas temperature $T_O$ at the downstream side, the heat release quantity $Q_1$ [W] can be represented as the following formula.

$$Q_1 = m_g C_p (T_i - T_O) \qquad \text{[Mathematical Formula 1]}$$

Wherein $m_g$ indicates waste gas weight speed and $C_p$ indicates the specific heat of the waste gas at the average temperature $T_a = (T_i + T_O)/2$, of the waste gas temperature between the temperature at the upstream side and temperature at the downstream side of the smoke channel. Further, the mathematical formula 1 can be represented as the following formula by the relation of $m_g = \rho_g V_g$.

$$Q_1 = \rho_g V_a C_P (T_i - T_O) \qquad \text{[Mathematical Formula 2]}$$

Wherein $\rho_g$ indicates the specific gravity of the waste gas at the average temperature $T_a$ and $V_a$ indicates the average flow rate $V_a = (V_i + V_O)/2$, between the flow rate at the upstream side and flow rate at the downstream side. $Q_1$ shown in the mathematical formula 2 can be determined by the waste gas temperatures ($T_i$, $T_O$) and the flow rates ($V_i$, $V_O$) at the upstream side and the downstream side of the smoke channel 170a.

Then, the heat release quantity $Q_2$ [W] of the waste gas of a detour channel passing the bypass tube 10 can be represented as the following formula.

$$Q_2 = S_{all} \frac{1}{\frac{1}{\alpha_i} + \frac{d_b}{\lambda_b} + \frac{1}{\alpha_0}} (T_a - T_A) \qquad \text{[Mathematical Formula 3]}$$

$$= (\pi D_b L_b) \frac{1}{\frac{1}{\alpha_i} + \frac{d_b}{\lambda_b} + \frac{1}{\alpha_0}} (T_a - T_A)$$

Wherein $S_{all}$ indicates the surface area of the bypass tube, $D_b$ and $L_b$ indicate respectively the sectional diameter of the bypass tube and the full length of the bypass tube, $\alpha_i$ and $\alpha_0$ indicate respectively average heat transfer coefficients at the inner wall and outer wall of the smoke channel, $d_b$ indicates the thickness of the bypass tube wall and $\lambda_b$ indicates the heat conductivity of the bypass tube at the temperature $T_p$ of the smoke channel wall surface. $Q_2$ shown in the mathematical formula 3 can be determined by the measurement values of the waste gas temperatures ($T_i$, $T_O$) and the flow rates ($V_i$, $V_O$) at the upstream side and the downstream side of the smoke channel 170a and further, the atmospheric temperature $T_A$ and the wall surface temperature $T_p$ of the smoke channel.

In the present invention, since the heat release of the waste gas is carried out by the bypass tube, the heat release quantity $Q_1$ of the waste gas the heat release quantity $Q_2$ of the waste gas through the bypass tube are the relation of $Q_1 = Q_2$. Thereby, when the sectional diameter of the bypass tube is known, the full length ($L_b$) of the bypass tube can be determined.

Then, when the number of the bypass tubes necessary for lowering the gas temperature to $T_O$ is referred to as n and length per one bypass tube is referred to as $l_b$, it can be represented as the following formula.

$$L_b = nl_b \qquad \text{[Mathematical Formula 4]}$$

The number of the bypass tubes 10 used for the heat release of the waste gas can be determined by the above description.

For example, when the number of the bypass tubes 10 passing the waste gas is 1, the opening and closing valve 14a is gradually closed for letting only the bypass tube 10 detours. Further, the opening and closing quantity of the opening and closing valve 14 can be arbitrarily adjusted between full opening and closing based on the waste gas flow rate, temperature difference and the like. Then, one portion of the waste gas flowing the smoke channel 170a pushes up the valve of the reverse-flow protective valve 12a installed at the introduction inlet of the bypass tube 10a and flows in the bypass tube 10a. The waste gas flowing in the bypass tube 10a is gradually cooled by heat release from the bypass wall surface. Further, it pushes up the reverse-flow protective valve 12b installed at the discharge orifice 10b of the bypass tube 10a and flows in the smoke channel 170a again. Thus, the waste gas is cooled to the dew point of acid through (detour) the bypass tube 10.

Further, when a plural number of the bypass tubes 10a to 10n are selected, the opening and closing valves 14a to 14n are closed so as to introduce the waste gas in the bypass tubes 10a to 10n. The flow channel of the waste gas flowing at the upstream side of the smoke channel 170a is blocked by the opening and closing valve 14a, and it pushes up the reverse-flow protective valve 12a of the discharge orifice 10a and flows in the bypass tube 10a. After the waste gas flowing the bypass tube 10a is cooled by the heat release of the bypass tube 10a, it flows from the reverse-flow protective valve 12b to the smoke channel 170a. Further, the flow channel is blocked again and the waste gas in the smoke channel 170a pushes up the reverse-flow protective valve 12a at the upstream side of the bypass tube 10b and flows in the bypass tube 10b. The waste gas flowing in the bypass tube 10b is cooled by heat release by the bypass tube 10b and then, flows from the reverse-flow protective valve 12b to the smoke channel 170a. The waste gas in the smoke channel 170a repeats such detour (the dotted line arrow mark of FIG. 1) until the bypass tube 10n.

The waste gas flowing the bypass tube 10 is cooled from 170° C. to the dew point of acid by heat release from the wall surface of the bypass tube 10. Further, $SO_3$ in the waste gas is converted to sulfuric acid mists from gaseous $SO_3$ by reaction with water and the diameter of the mists is enlarged by condensation.

Further, when one portion of the waste gas is introduced in the bypass tube 10 by the opening and closing valve 14, the sulfuric acid mists with large mist diameter that are discharged from the discharge orifice 10b of the waste gas of the bypass tube 10 generate sulfuric acid mists with large particle diameters in chain reaction by being condensed with other $SO_3$ gas in the smoke channel 170 that does not pass the bypass tube 10.

Further, the cooling time of $SO_3$ mist related to Embodiment can be set as disclosed in Japanese Unexamined Patent Publication No.2002-45643 and the cooling time had better to be 0.5 sec or more so that an average mist diameter is 1.7 μm to 2.0 μm and large within a range of the dew point of acid of 120° C. to 150° C. Accordingly, the length of the bypass tube 10 had better to be set as a length at which there is obtained a flow channel length capable of securing cooling time of 0.5 sec or more that is necessary for enlarging particle diameters by cooling the sulfuric acid mists in the waste gas.

The sulfuric acid mists with such large particle diameters are introduced into the wet desulfurization apparatus 140 and slurry such as lime hydrate and magnesium hydroxide is sprayed to be lowered to nearby the dew point of acid of water. $SO_2$ and the sulfuric acid mists are removed in the wet desulfurization apparatus 140. The waste gas desulfurized is introduced into the wet type electrostatic precipitator 150.

Thus, the wet type electrostatic precipitator 150 related to the present Embodiment can lessen the volume of the apparatus because the sulfuric acid mists with large mist diameter are removed at the wet desulfurization apparatus 140 of the frontal stage and initial cost and running cost can be reduced.

Further, the control of the temperature of the dew point of acid of the waste gas in the smoke channel may be carried out by visually confirming the measurement value of the temperature sensor 16 and the opening and closing quantity of the opening and closing valve 14 of the smoke channel 170a may be manually adjusted. Further, a heat release fin may be provided on the outer surface of the bypass tube. Thereby, the heat release quantity of the waste gas is increased and the length of the bypass tube can be designed to be shortened. Further, as the reverse-flow protective valve 12 of the bypass tube 10, the opening and closing valve may be used if the tube channel can be opened and closed.

In the present Embodiment, the adjustment of the flow channel length of the waste gas related to cooling by heat release to the dew point of acid of the waste gas is carried out by selecting the number of the bypass tubes passing the waste gas, but other mode may be used so far as the piping for adjusting the flow channel length is freely stretched and shrunk, and for example, a concertina structure and a telescopic structure may be well. Further, in the present Embodiment, the flow channel length is adjusted by stretching and shrinking a piping forming the flow channel, but a mode other than this may be well. For example, a lattice shape is formed by piping to 2 dimensional or 3 dimensional direction and a piping not externally released other than the inlet and outlet of the waste gas (for example, piping such as monkey bar) is composed, valves are provided at the crossing portion of the piping, one channel from upstream to downstream is formed so as to go a labyrinth by the selective opening and closing control of the valve, and the flow channel length of the waste gas can be also adjusted by changing a channel flowing the waste gas.

Figure 4:
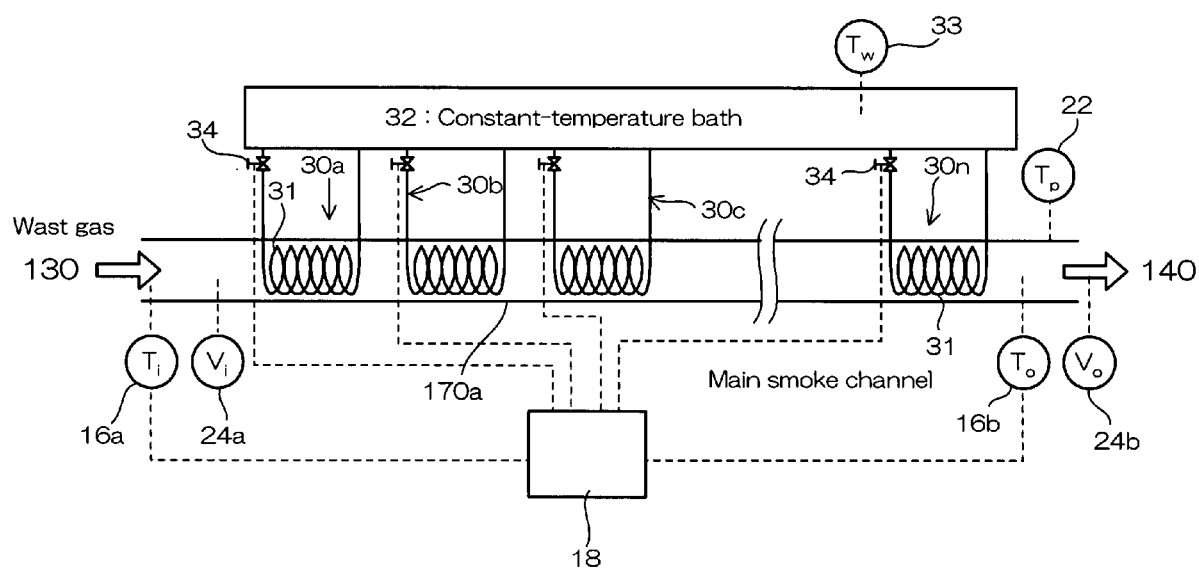
FIG. 4 is an explanation diagram of the variation example of the process for disposing waste gas containing sulfur oxides related to the present invention.

Then, the variation example of the disposal apparatus of waste gas of the present invention is explained. FIG. 4 is an explanation diagram showing the variation example of the process for disposing waste gas of the present invention. The variation example shown in FIG. 4 uses heat exchangers 30 having similar action in place of the heat release means of the waste gas shown in FIG. 1. The heat exchangers related to Embodiment are for example, a heat exchanger in which a heat transfer tube is wound in a coil shape, the coil portion 31 is inserted in the smoke channel 170 and both ends of the heat transfer tube are installed on a constant-temperature bath 32 feeding a cooling medium in the heat transfer tube. Further, an opening and closing valve 34 is installed between either of one end of the heat transfer tube and the constant-temperature bath 32. A plural number of the heat exchangers 30 are installed in series along the channel of the waste gas in the inside of the smoke channel 170a between the dry type electrostatic precipitator 130 and the wet desulfurization apparatus 140. As similar as FIG. 1, the first temperature sensor 16a, the second temperature sensor 16b, the waste gas flow rate sensors 24a and 24b and the temperature sensor 22 of the smoke channel wall surface are installed in the smoke channel 170a and act in like manner as FIG. 1 and its detailed explanation is abbreviated. Further, a cooling medium temperature sensor 33 is provided in the constant-temperature bath 32 and the cooling medium temperature Tw of the constant-temperature bath 32 is constituted to be able to be transferred to the control portion 18.

The disposal apparatus of waste gas according to the above-mentioned constitution carries out similar disposal as the disposal apparatus shown in FIG. 1. Namely, the waste gas temperatures and the flow rates at the upstream side and downstream side of the smoke channel 170a in which the waste gas through dust removal treatment flows, the cooling medium temperature of the constant-temperature bath and the wall surface temperature of the smoke channel are measured. $Q_1$ is determined based on the measurement values. Further, $Q_2$ can be similarly determined by applying heat exchangers in place of the bypass tubes and the cooling medium temperature Tw of the constant-temperature bath 32 in place of the atmospheric air temperature $T_A$ respectively. Thereby, the control portion 18 controls the operational number of the heat exchangers 30 so that the waste gas temperature at the downstream side of the smoke channel is the dew point of acid and releases the opening and closing valves of the heat exchangers 30 to be operated. The cooling medium from the constant-temperature bath 32 is fed to the heat exchangers 30 released and when the waste gas in the smoke channel passes the heat exchangers 30, it is brought in contact with the surface of the coil 31 and cooled to the dew point of acid by heat exchange. Further, $SO_3$ in the waste gas become sulfuric acid mists from gaseous $SO_3$ and is condensed to enlarge mist diameters. Also in the variation example, the length of heat exchange zone had better to be adjusted by determining the operational number of the heat exchangers so that cooling time at the above-mentioned dew point of acid is 0.5 sec or more. Hereat, the length of heat exchange zone means the same length as dimension obtained by multiplying dimension to the smoke channel direction of the coil 31 with the operational number of the heat exchangers.

Further, the heat exchange means shown in FIG. 4 shows a mode in which heat exchangers are inserted in the smoke channel but the mode of the heat exchangers is not limited to this so far as it is a constitution that the waste gas flowing in the smoke channel can be cooled. For example, similar effect can be expected even by a mode winding them on the outer surface of the smoke channel.

The invention claimed is:

1. A process for disposing waste gas containing sulfur oxides, the processing comprising:
   introducing the waste gas into a dry type electrostatic precipitator to remove dust;
   introducing the waste gas in a wet desulfurization apparatus to carry out desulfurization;
   measuring a temperature of the waste gas of a smoke channel at a more upstream side than the wet desulfurization apparatus;
   cooling the waste gas to an acid dew point of sulfuric acid by heat release, based on the measured waste gas temperature and a flow of the waste gas;
   adjusting a length of a smoke channel through which the waste gas flows; and
   collecting sulfuric acid mist contained in the waste gas by the wet desulfurization apparatus.

2. A process for disposing waste gas containing sulfur oxides, the process comprising:
   introducing the waste gas into a dry type electrostatic precipitator to remove dust;
   introducing the waste gas in a wet desulfurization apparatus to carry out desulfurization;
   measuring a temperature of the waste gas of a smoke channel at a more upstream side than the wet desulfurization apparatus;
   cooling the waste gas to an acid dew point of sulfuric acid by heat release, based on the measured waste gas temperature and a flow of the waste gas;
   adjusting a length of a heat exchange zone through which the waste gas flows; and
   collecting sulfuric acid mist contained in the waste gas by the wet desulfurization apparatus.

3. The process for disposing waste gas containing sulfur oxides according to claim 2, wherein the adjustment of the length of the heat exchange zone is carried out by controlling an operational number of heat exchangers in which temperature at the downstream side of the heat exchangers is the dew point of acid of the waste gas using the heat exchangers arranged in series in the smoke channel.

4. An apparatus for disposing waste gas containing sulfur oxides, the apparatus comprising:
   a dry type electrostatic precipitator that removes dust;
   a wet desulfurization apparatus that collects sulfuric acid mist contained in the waste gas;
   a heat release unit that detours a channel of the waste gas that flows through a smoke channel between the dry electrostatic precipitator and the wet desulfurization apparatus, and that cools down the waste gas;
   a sensor that measures waste gas temperature and a flow of the waste gas in a smoke channel upstream from the wet desulfrization apparatus; and
   a control portion that connects with the heat release unit and the sensor, and controls the cooling of the temperature of the waste gas to an acid dew point of sulfuric acid by the heat release unit, based on the measured waste gas temperature from the sensor.

* * * * *